(12) United States Patent
Klimov et al.

(10) Patent No.: US 10,648,789 B2
(45) Date of Patent: May 12, 2020

(54) METHOD FOR MONITORING LINEAR DIMENSIONS OF THREE-DIMENSIONAL OBJECTS

(71) Applicant: ARTEC EUROPE S.á r.l., Luxembourg (LU)

(72) Inventors: Andrei V. Klimov, Moscow (RU); Aleksandr Georgievich Lomakin, Moscow (RU); Sergey V. Sukhovey, Moscow (RU); Gleb A. Gusev, Moscow (RU); Artem L. Yukhin, Moscow (RU)

(73) Assignee: ARTEC EUROPE S.á r.l., Luxembourg (LU)

( * ) Notice: Subject to any disclaimer, the term of this patent is extended or adjusted under 35 U.S.C. 154(b) by 0 days.

(21) Appl. No.: 14/441,499

(22) PCT Filed: Nov. 7, 2012

(86) PCT No.: PCT/RU2012/000909
§ 371 (c)(1),
(2) Date: Nov. 9, 2018

(87) PCT Pub. No.: WO2014/074003
PCT Pub. Date: May 15, 2014

(65) Prior Publication Data
US 2019/0234725 A1 Aug. 1, 2019

(51) Int. Cl.
*G01B 11/00* (2006.01)
*G01B 11/25* (2006.01)

(52) U.S. Cl.
CPC ............ *G01B 11/002* (2013.01); *G01B 11/25* (2013.01); *G01B 11/2545* (2013.01)

(58) Field of Classification Search
CPC ... G01B 11/002; G01B 11/2545; G01B 11/25; G01B 11/02; G01B 21/045
See application file for complete search history.

(56) References Cited

U.S. PATENT DOCUMENTS 4,370,058 A * 1/1983 Trotscher ........... G01M 11/0228
356/125
4,547,674 A * 10/1985 Pryor ...................... G01S 17/48
250/559.23

(Continued)

FOREIGN PATENT DOCUMENTS

JP 2006258486 A * 9/2006
RU 2184933 C1 7/2002
WO WO2009/032641 A1 3/2009

OTHER PUBLICATIONS

Artec Europe S.A.R.L., Notification of 2nd Office Action, CN201280078106.2, dated Jun. 4, 2018, 7 pgs.

(Continued)

*Primary Examiner* — Mohamed K Amara
(74) *Attorney, Agent, or Firm* — Morgan, Lewis & Bockius LLP (57) ABSTRACT

A method of 3D measurement is performed using a first camera and a second camera located at different distances from the projector. The method includes projecting a known projection pattern that includes at least two non-crossing lines to form a first band and a second band on a surface of an object. The method includes recording first and second images of the object using the first and second cameras, respectively. The method includes determining a first longitudinal coordinate of a first point within the first band and a first vertical coordinate of the first point within the first band; determining a second longitudinal coordinate of the first point within the first band; and determining a second vertical coordinate of the first point within the first band. The method includes determining a final vertical coordinate of the first point by comparing the first longitudinal coordinate to the second longitudinal coordinate.

15 Claims, 12 Drawing Sheets

(56) References Cited

U.S. PATENT DOCUMENTS

| | | | | |
|---|---|---|---|---|
| 4,948,258 A * | 8/1990 | Caimi | G01B 11/2441 | 356/3.13 |
| 5,042,945 A * | 8/1991 | Shibata | G03F 1/22 | 356/150 |
| 5,307,151 A * | 4/1994 | Hof | G06T 7/521 | 33/200 |
| 5,461,478 A * | 10/1995 | Sakakibara | G01B 11/245 | 356/623 |
| 5,548,392 A * | 8/1996 | Ogawa | G01B 9/06 | 356/3.13 |
| 5,973,772 A * | 10/1999 | Fukuma | G01M 11/0235 | 33/200 |
| 6,028,672 A * | 2/2000 | Geng | G01B 11/022 | 250/237 G |
| 6,049,625 A * | 4/2000 | Sakamoto | G06T 7/596 | 382/154 |
| 6,075,605 A * | 6/2000 | Futamura | G01B 11/2518 | 250/559.22 |
| 6,175,415 B1 * | 1/2001 | Pietrzak | G01B 11/02 | 356/602 |
| 6,256,099 B1 * | 7/2001 | Kaufman | G01B 11/2545 | 356/603 |
| 6,377,700 B1 * | 4/2002 | Mack | G01B 11/25 | 382/154 |
| 6,393,141 B1 * | 5/2002 | Cronshaw | G01B 11/25 | 382/141 |
| 6,473,168 B1 * | 10/2002 | Ruymen | G01N 21/8901 | 356/237.2 |
| 6,493,095 B1 * | 12/2002 | Song | G01B 11/25 | 356/603 |
| 6,813,030 B2 * | 11/2004 | Tanno | A61B 5/0073 | 356/477 |
| 6,970,600 B2 * | 11/2005 | Abe | G01B 11/2509 | 345/178 |
| 7,271,377 B2 * | 9/2007 | Mueller | G01B 11/00 | 250/208.1 |
| 7,375,826 B1 * | 5/2008 | Lavelle | G01B 11/2518 | 356/606 |
| 7,747,067 B2 * | 6/2010 | Popescu | G01B 11/25 | 382/154 |
| 8,197,070 B2 * | 6/2012 | Tan | G01B 11/25 | 353/31 |
| 8,224,064 B1 * | 7/2012 | Hassebrook | G01B 11/2513 | 382/154 |
| 9,582,889 B2 * | 2/2017 | Shpunt | G01B 11/22 | |
| 10,371,507 B2 * | 8/2019 | Nakamura | G01B 11/2518 | |
| 2003/0002051 A1 * | 1/2003 | Cohn | G01B 11/2545 | 356/601 |
| 2003/0038933 A1 * | 2/2003 | Shirley | G01B 11/25 | 356/243.1 |
| 2003/0042401 A1 * | 3/2003 | Gartner | G01B 11/245 | 250/208.1 |
| 2003/0072011 A1 * | 4/2003 | Shirley | G01B 11/25 | 356/601 |
| 2003/0174880 A1 * | 9/2003 | Sakamoto | G01B 11/25 | 382/154 |
| 2004/0130729 A1 * | 7/2004 | Van Coppenolle | G01B 11/002 | 356/601 |
| 2004/0151365 A1 * | 8/2004 | An Chang | G06K 9/2036 | 382/154 |
| 2004/0222987 A1 * | 11/2004 | Chang | G01B 11/2509 | 345/419 |
| 2005/0018209 A1 * | 1/2005 | Lemelin | G01B 11/25 | 356/604 |
| 2007/0025612 A1 * | 2/2007 | Iwasaki | G01B 11/25 | 382/154 |
| 2007/0295888 A1 * | 12/2007 | Czarnek | A61B 5/0059 | 250/206 |
| 2009/0046895 A1 * | 2/2009 | Pettersson | G01B 11/005 | 382/106 |
| 2009/0097039 A1 * | 4/2009 | Kawasaki | G01B 11/2509 | 356/603 |
| 2009/0268199 A1 * | 10/2009 | Inoguchi | G01B 11/24 | 356/124 |
| 2009/0268214 A1 * | 10/2009 | Lucic | G01B 11/25 | 356/614 |
| 2010/0208306 A1 * | 8/2010 | Fukutome | H04N 1/00002 | 358/412 |
| 2010/0222684 A1 * | 9/2010 | Hatzilias | G01B 11/25 | 600/476 |
| 2010/0302554 A1 * | 12/2010 | Keshavmurthy | G01B 11/2531 | 356/620 |
| 2010/0302558 A1 * | 12/2010 | Lin | G01B 11/2531 | 356/623 |
| 2010/0309301 A1 * | 12/2010 | Thiel | A61B 5/0088 | 348/77 |
| 2010/0309483 A1 * | 12/2010 | Crowther | B25B 5/06 | 356/606 |
| 2010/0314002 A1 * | 12/2010 | Giudiceandrea | B27B 1/00 | 144/359 |
| 2011/0043803 A1 * | 2/2011 | Nygaard | G01B 11/2425 | 356/399 |
| 2011/0081072 A1 * | 4/2011 | Kawasaki | G01B 11/25 | 382/154 |
| 2011/0134225 A1 * | 6/2011 | Saint-Pierre | G01B 11/03 | 348/47 |
| 2011/0229840 A1 * | 9/2011 | Liang | A61B 5/1077 | 433/29 |
| 2011/0270562 A1 * | 11/2011 | Ito | G01B 11/25 | 702/94 |
| 2012/0081539 A1 * | 4/2012 | Ichizawa | G01N 21/8903 | 348/95 |
| 2012/0141949 A1 * | 6/2012 | Bodony | G01B 11/25 | 433/29 |
| 2012/0154576 A1 * | 6/2012 | Weston | G01B 11/007 | 348/136 |
| 2012/0200693 A1 * | 8/2012 | Lippert | G02B 21/002 | 348/79 |
| 2012/0229816 A1 * | 9/2012 | Rodrigue | G01B 11/245 | 356/610 |
| 2013/0016362 A1 * | 1/2013 | Gong | G01B 11/2527 | 356/610 |
| 2013/0033596 A1 * | 2/2013 | Crothers | G01B 21/045 | 348/135 |
| 2013/0050410 A1 * | 2/2013 | Steinbichler | G01B 21/042 | 348/42 |
| 2013/0050712 A1 * | 2/2013 | Samukawa | G01B 11/24 | 356/612 |
| 2013/0060146 A1 * | 3/2013 | Yang | A61B 5/055 | 600/476 |
| 2013/0076857 A1 * | 3/2013 | Kurashige | G01B 11/25 | 348/40 |
| 2013/0100282 A1 * | 4/2013 | Siercks | G01B 11/2513 | 348/135 |
| 2013/0121592 A1 * | 5/2013 | Fujiki | G01B 11/002 | 382/195 |
| 2013/0155417 A1 * | 6/2013 | Ohsawa | G01B 11/2536 | 356/610 |
| 2013/0163718 A1 * | 6/2013 | Lindenberg | G01B 11/25 | 378/39 |
| 2014/0253929 A1 * | 9/2014 | Huang | G01B 11/245 | 356/611 |
| 2015/0292876 A1 * | 10/2015 | Pettersson | G01C 15/00 | 348/136 |
| 2019/0236798 A1 * | 8/2019 | Rochette | G01B 11/2513 | |

OTHER PUBLICATIONS

Artec Europe S.A.R.L., Notification of Allowance, CN201280078106.2, dated Oct. 29, 2018, 4 pgs.

Artec Europe S.A.R.L., Certificae of Grant, CN201280078106.2, dated Jan. 8, 2019, 5 pgs.

Artec Europe S.A.R.L., Decision to Grant, EP12887908-7, dated Apr. 19, 2018, 2 pgs.

Artec Europe S.A.R.L., Certificate of Patent, EP12887908-7, dated May 16, 2018, 1 pg.

(56) References Cited

OTHER PUBLICATIONS

Artec Europe S.A.R.L., Certificate of Grant, HK16102982.8, dated Jun. 28, 2019, 3 pg.
International Search Report and Written Opinion, PCT/RU2012/000909, dated Aug. 29, 2013, 14 pgs.
International Preliminary Report on Patentability, PCT/RU2012/000909, dated May 12, 2015, 5 pgs.

* cited by examiner

METHOD FOR MONITORING LINEAR DIMENSIONS OF THREE-DIMENSIONAL OBJECTS

FIELD OF THE INVENTION

The invention pertains to measuring instruments and can be used for 3D measurements with an adequate accuracy and display of three-dimensional object contours by observing a known projected pattern at various triangulation angles.

DESCRIPTION OF THE STATE OF THE ART

A previously known method for controlling linear dimensions of three-dimensional objects based on three coordinates consists of forming a probing structured backlighting on the surface of the controlled object by projecting on the surface of the controlled object a beam of light, characterized by modulated spatial intensity, registering of the image of the probing backlight pattern distorted by the topography of the controlled object's surface and determining the height of the controlled object's surface topography with a digital electronic computer measuring the topographic height based on the distortion value of the probing backlighting pattern, and calculating the other two coordinates based on the position of the backlighting pattern distortions in the registered image (WO 99/58930).

The disadvantages of the known method are a high error rate caused by the fact that when optical radiation modulated along one of the coordinates through a transparency filter with a non-varied regular structure is directed at the controlled object surface, it is impossible to foresee or take into account in advance the image distortions caused by different reflective properties of the surface and deep recesses, which cannot be identified without any prior information about the macrostructure of the controlled object surface.

The previous techniques include a method to control linear dimensions of three-dimensional objects based on three Cartesian coordinates and a device implementing it. The method consists in projecting a system of multicolored bands created by spatial modulation of the probing optical radiation intensity along one of the coordinate. The system is characterized by alternating bands and creates a structured backlighting. As a result, the entire part of the controlled object surface in the photodetector's field of view and the distorted image of the structured backlighting "superimposed" on the surface are recorded in one frame. The controlled dimensions are assessed based on the degree to which the image of the band set is distorted and on the position of the bands in the Cartesian system (WO 00/70303).

The limitation of the previously used method and the devices using it is poor accuracy related to the impossibility of unambiguous interpretation of the gaps in the image of the bands distorted by the contour of the controlled object surface, or by through holes, or by a low spectral reflectance value depending on the color of some area of the controlled object surface. If the controlled object is a total of local components, e.g. a set of turbine blades, reconstruction of such object's topology and the subsequent control of its linear dimensions using the above method are impossible.

The previously used method for optical measurement of the surface shape involves placing the surface in the illumination field of the optical projection system and simultaneously in the field of view of the device for recording images of the above surface, projecting a set of images with a known structure of the light flux to the measured surface using the above projection optical system, recording the set of the corresponding images of the surface observed at an angle different from the image set projection angle, and determining the shape of the measured surface based on the recorded images. In this case, at least three periodic distributions of the light intensity are projected alternately to the surface mentioned above, these distributions being a set of bands whose intensity varies transversely following the sinusoidal principle and differing in the shift of this set of bands in the direction perpendicular to the bands by a controlled value within a band, and the recorded images are processed to receive a preliminary phase distribution containing the phases corresponding to points on the surface. Besides, a complementary distribution of light intensity is momentarily projected on the above surface, making it possible to determine the number of the band from the above set of bands for each point of the above surface, an additional image of the above surface is recorded; the resulting phase distribution is obtained for each visible point of the above surface, based on the above image of the object, illuminated by the preliminary phase distribution, and the above image of the object illuminated by the complementary phase distribution. And based on the above resulting phase distribution, absolute coordinates of the above surface points are obtained using the preliminary calibration data. When measurements are performed using the above methods, it is assumed that an image of each point of the surface is recorded under the conditions when it is illuminated only with a direct beam emitted by the projection unit, and the illumination of this object point image as recorded is considered proportionate to the brightness of the beam focused on this point directly from the projection unit (RU No. 2148793).

The limitations of this method consist of the complexity of the device using it and the process duration requiring considerable time for measurements and leaving room for errors in the event of mechanical oscillations of the equipment (projection unit and camera) positions.

The previous techniques include a method and a device for remote control and recognition of three-dimensional object surfaces using the structured backlighting method involving a source of optical radiation and—installed in sequence following the radiation course—a transparency filter providing for a possibility of forming a non-periodic line structure of bands, an afocal optical system for projecting the transparency filter image on the controlled surface, a receiving lens forming the image of the line structure picture appearing on the controlled object surface distorted by the contour of the controlled object surface, a photorecorder digitizing the image formed by the receiving lens, and an electronic digital computing unit converting the digital images recorded by the photorecorder to coordinate values on the controlled surface; the device is provided with additional N−1 sources of radiation, each of them differing from the others in the radiation spectral range, N−1 transparency filters, each of them differing in at least one band from the others, N−1 lenses installed after the transparency filters, N−1 mirrors installed at a 45-degree angle to the optical axis of each of the N−1 lenses before the second component of the afocal optical system, second N−1 mirrors installed behind the receiving lens at a 45-degree angle to the receiving lens optical axis, N−1 secondary receiving lenses, each of them installed behind each of the second N−1 mirrors and, jointly with the receiving lens, forming the image of the pictures of the line structure appearing on the controlled object surface distorted by the contour of the controlled object surface, N−1 photorecorders, each of them having a spectral sensitivity range coinciding with the spectral radiation range of one of the N−1 radiation sources, N−1 digital electronic computing units; the electronic image addition unit is implemented with the number of inputs equal to the number of the digital electronic computing units, with each of the electronic image addition unit input connected to the output of each digital electronic computing unit, and the number N is determined according to the formula $N=\text{Log}_2(L)$, where L is the number of pairs of the photorecorder sample resolution cells (RU No. 2199718).

The limitations of this method also consist of the complexity of the device using it and the process duration requiring considerable time for measurements and leaving room for errors in the event of mechanical oscillations of the equipment (projection unit and camera) positions.

The previous techniques include a method to control linear dimensions of three-dimensional objects based on three Cartesian coordinates and a device using it, in which two cameras are located on the right and on the left of the projection unit, thus forming a stereoscopic pair akin to human vision.

The projection unit projects an image of bands onto the object. Images are received from both the right and the left cameras, and then the two images are compared using correlation methods, i.e. each band from the right image is paired with a similar band in the left image by searching through all the bands in the left image (U.S. Pat. No. 6,377,700, prototype).

The limitation of this method is the long time required for searching through all the possible pairs of bands and the long correlation algorithm running time.

DISCLOSURE OF THE INVENTION

The object of this invention is therefore to create an effective and efficient method of controlling linear dimensions of three-dimensional objects, as well as to expand the range of methods for controlling linear dimensions of three-dimensional objects.

The technical result ensuring that the object is achieved consists of simplification and complete automation of the process of controlling linear dimensions of three-dimensional objects, reduction of the measurement process duration and nearly complete elimination of errors in the event of mechanical oscillations arising in positions of the equipment (projection unit and cameras) in relation to the measurement object, as the projection unit and cameras are executed as a portable tool in a single housing.

The spirit of the invention is that the method of carrying out 3D measurements of an object using structured backlighting assumes that the projection unit is used to project onto the controlled object a known image having at least two non-crossing lines along one of the longitudinal axes, then the projected light reflected from the object is recorded using at least two cameras located at different distances from the projection unit with formation of different triangulation angles between the central projected beam and the central beams of the cameras, and each line projected by the projection unit and formed by the reflected light received by each camera is identified by comparing the coordinates of the lines received by the cameras, with the triangulation angle between the central beam of the projection unit and the central beam of the first camera located at a minimum distance from the projection unit set equal to the arctangent of the ratio of the distance between the projected bands and the focal depth of this camera lens, the longitudinal coordinates of the line centers and the vertical coordinates are determined in the image from the first camera as the quotient of the longitudinal coordinate by the tangent of the triangulation angle between the central beam of the projection unit and the central beam of the first camera, and to adjust the vertical coordinate its value obtained using the second camera located at a greater triangulation angle than the first camera is used, wherefore the location of the same lines is identified in the second camera image as the closest to the longitudinal coordinates calculated as the product of the above vertical coordinate determined using the first camera and the tangent of the second camera triangulation angle, and then the adjusted values of the longitudinal and vertical coordinates are determined for these lines.

The preferable method for determining the longitudinal coordinates of the line centers in the first camera image is taking the brightest pixels across their width. The distance between the camera and the projection unit is assumed as the product of the distance from the projection unit to the intersection point of the central beams of the projection unit and the camera and the tangent of the triangulation angle between the central beam of the projection unit and the central beam of the camera. The vertical coordinate value obtained using the third, fourth and subsequent cameras is used for further adjustment of the vertical coordinate.

In certain devices using the method cameras, are located on one or on both sides of the projection unit. Coordinates are preferably measured and determined using a computer processor, and a 3D image is outputted to the computer display.

DRAWING FIGURES

FIG. 5 shows the possible band images projected by the projection unit and received by the cameras (5a—image of the bands on the projection unit, 5c—contour of the bands image on the projection unit, 5b—image of the bands on the camera, 5d—contour of the bands image on the camera), FIG. 6—lines corresponding to the bands emitted from the projection unit as parallel straight lines, FIG. 7—additional lines corresponding to the bands emitted from the projection unit, FIG. 8—lines corresponding to bands projected to two cameras, FIG. 9 shows the projection system (unit) diagram, FIG. 10—an alternative device with cameras located on both sides of the projection unit and the corresponding overlapping of the cameras' fields of view, FIG. 11—an alternative layout with three cameras on one side of the projection unit and the corresponding overlapping of the cameras' fields of view.

PREFERABLE EMBODIMENT OF THE INVENTION

Figure 1:
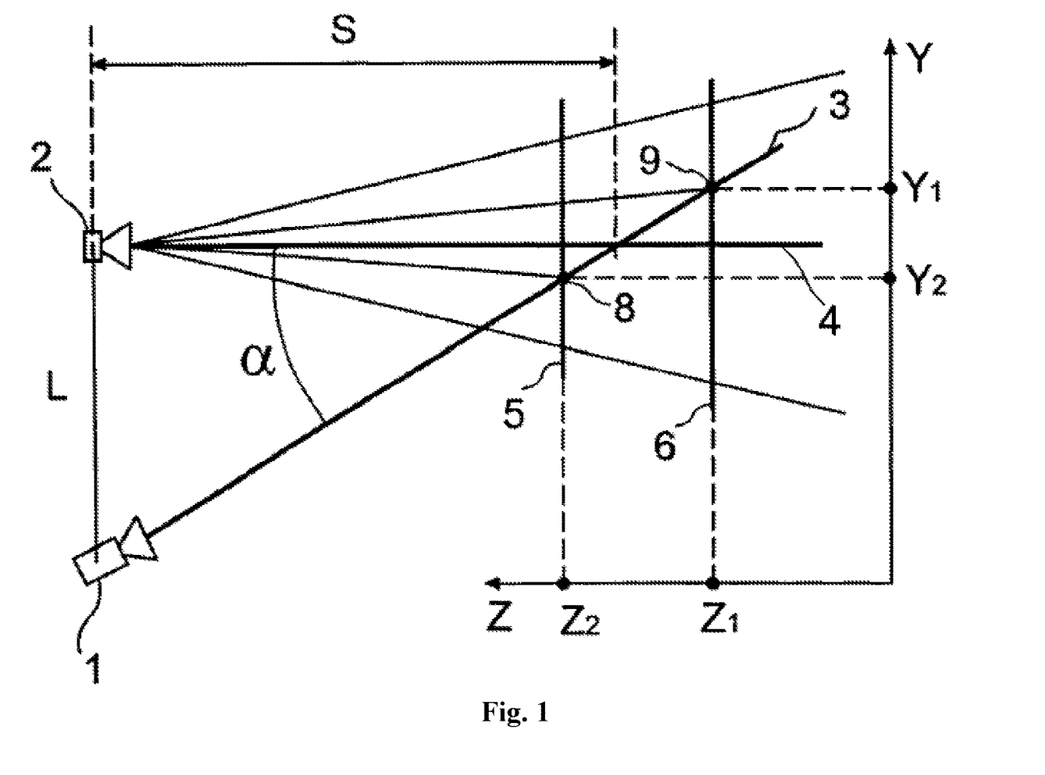
FIG. 1 shows the layout of the projection unit and the camera when one beam is projected.

FIG. 1 shows a device comprised of projection unit 1 which projects the predetermined image onto the object and the camera 2 recording and transmitting to the computer (not shown) the light emitted by projection unit 1 and reflected from the object, at a certain triangulation angle α (angle between the central beam of the projection unit 3 and central beam 4 of camera 1.

The distance L between the camera and the projection unit is called the base. The base can be chosen as follows.

L=s*tg α, where s is the distance from the projection unit to the intersection point of the central beams of the projection unit and the camera (m).

Figure 2:
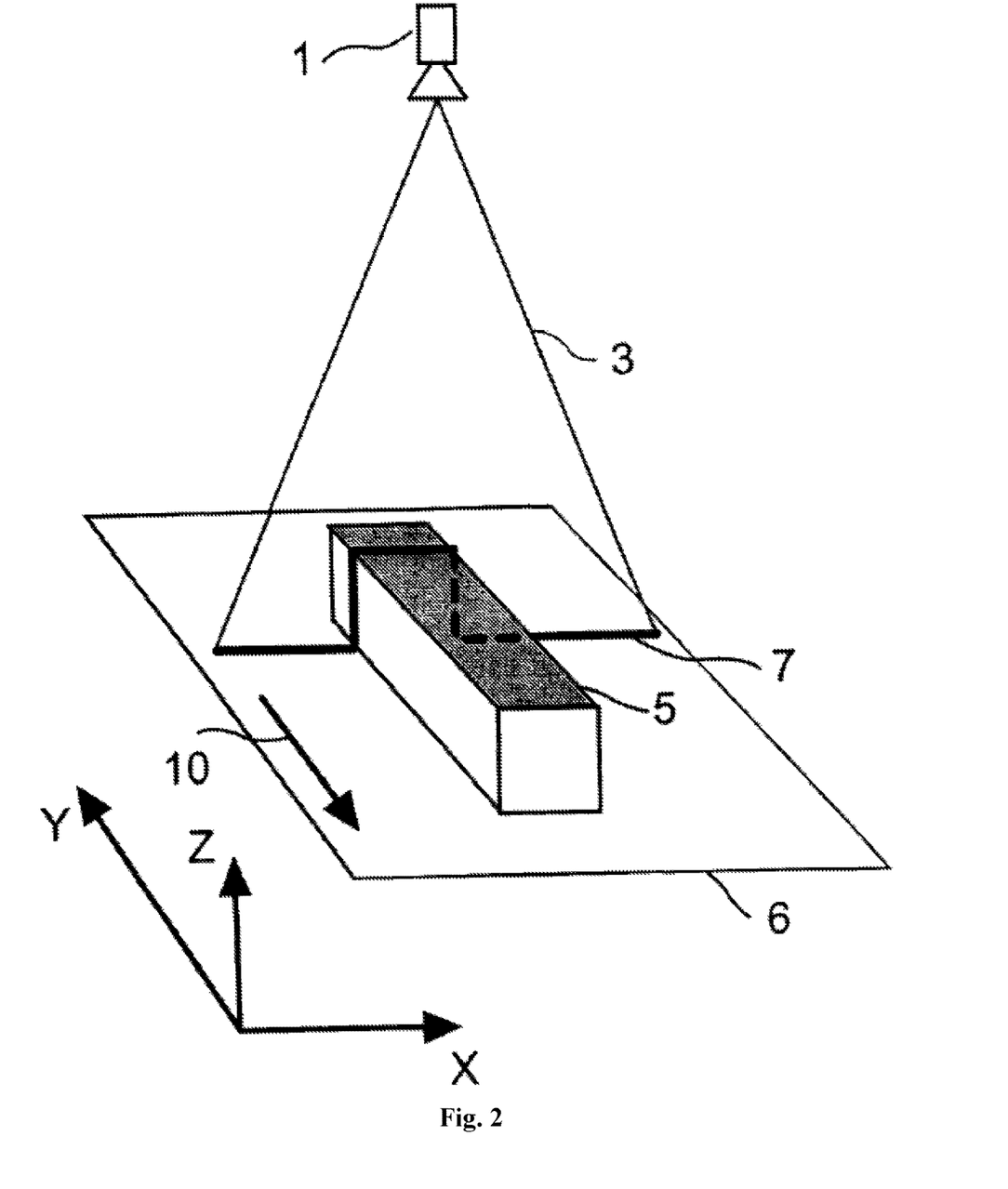
FIG. 2 shows the diagram of one line projected onto a three-dimensional object.

In the simplest case, projection unit 1 projects one horizontal band 3 which coincides with the central beam of the projection unit in FIG. 1. FIG. 2 is a view from camera 2. FIG. 2 shows the way band 3 is distorted due to the curvature of the object shown as planes 5 and 6, and a trace 7 of the reflected band 3 is seen in the image of camera 2. FIG. 1 shows a side view of the same setup as in FIG. 2, and band 3 crosses plane 5 and plane 6 at different distances Z1 and Z2 from the camera and intersection points 8 and 9 have different coordinates Y1 and Y2. In a general case, from this follows the Z=y/tg α ratio for obtaining the Z coordinate using the Y coordinate.

Then this band is usually used to scan the surface along the Y axis in FIG. 2 to obtain 3D measurements of the object in the camera's field of view with the greatest degree of detail possible.

Figure 3:
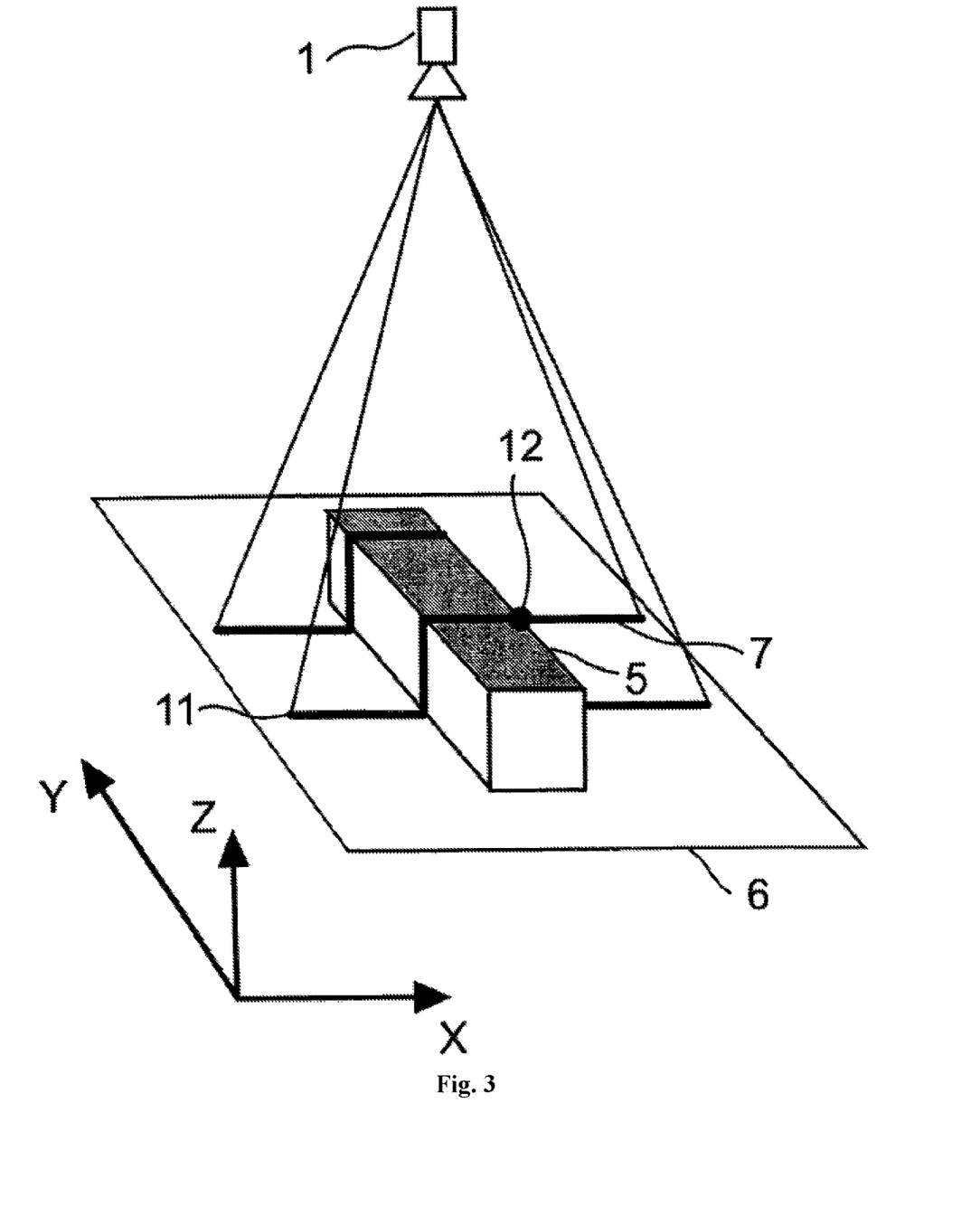
FIG. 3 shows the diagram of two lines projected onto a three-dimensional object.
Figure 4:
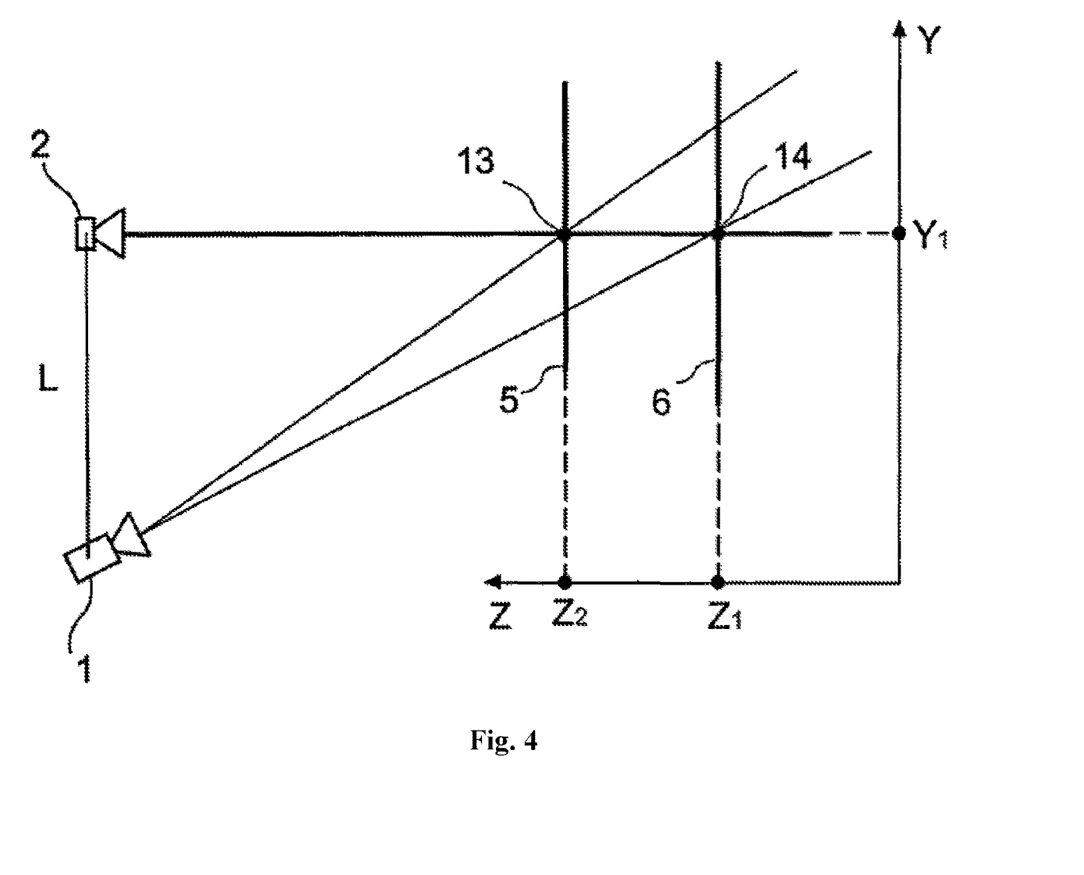
FIG. 4 shows the layout of the projection unit and the camera when two beams are projected.
Figure 5A:
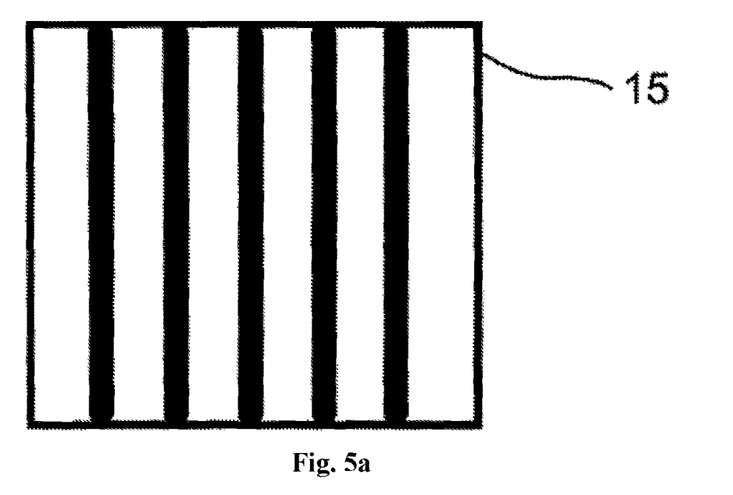
Figure 5B:
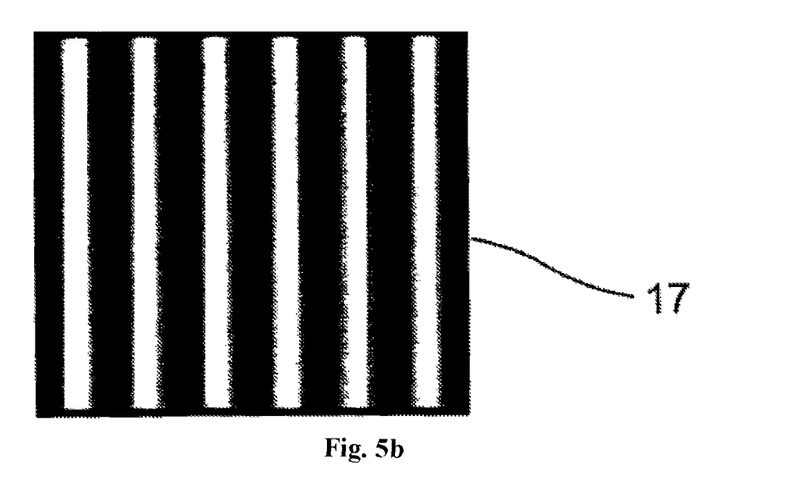
Figure 5C:
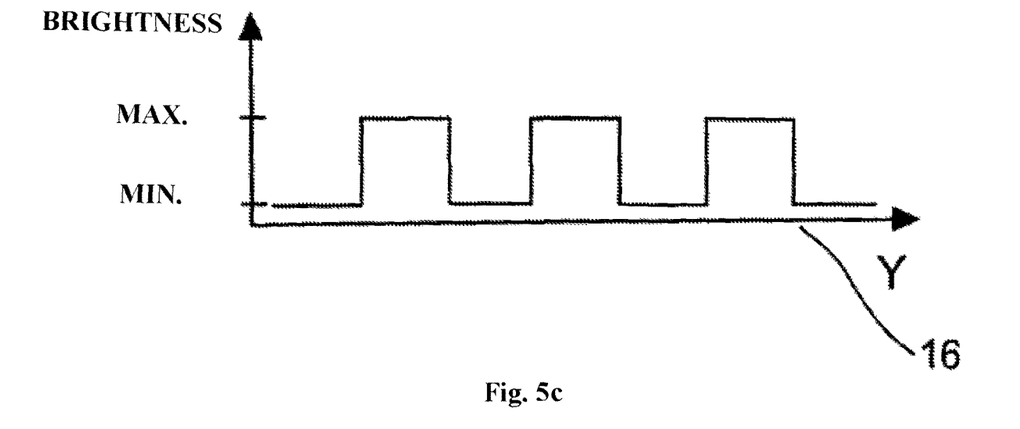
Figure 5D:
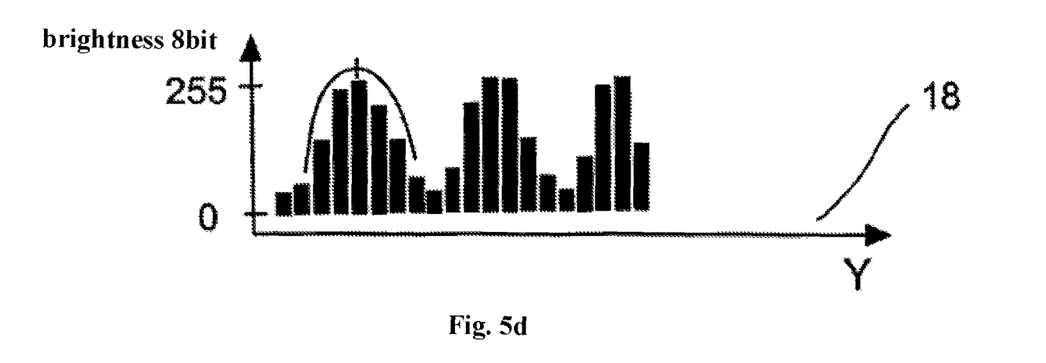

If camera 2 sees only one band projected by projection unit 1 per frame, to obtain such measurements this band would have to be shifted by the smallest distance possible and as many images would have to be received from camera 2 as possible. This invariably requires a lot of time. The common affordable camera 2 has the frame rate of 25 fps and the resolution of 1 MP, i.e. 1,000 pixels along the Y coordinate axis and 1,000 pixels along the X coordinate axis. We have 1,000 pixels on the band along the X coordinate axis, i.e. 1,000 measurements. To obtain the same number of measurements along both the axes, we have to project the band 1,000 times shifting it by one pixel along the Y coordinate axis, receiving 1,000 frames from camera 2 for this purpose, which takes 40 seconds. If the number of images should be decreased and more measurements obtained from one camera 2 image, in accordance with the method, two bands should be projected, as in FIG. 3, or more, instead of only one band, but ambiguities arise in the bands identification. In FIG. 3 band 7 merged with band 11 at point 12 for one camera (2). This ambiguity results in an error in determining the Z coordinate. One Y coordinate may correspond to two Z1 and Z2 coordinates on the camera image. On FIG. 4 two beams representing the bands are emitted from the projection unit 1. Points 13 and 14 in FIG. 4 are points of ambiguity.

The ambiguity must be resolved when several bands are projected. For this purpose the following terms and algorithms are introduced: T—interval between the bands, Tz—the measured volume usually defined by the focal depth of the lenses used in the projection unit and camera 2. Focal depth Tz is the distance along the Z axis within which we can observe a sufficiently contrasting image of the bands projected by us, i.e. we can see where the band starts and finishes. Focal depth Tz can be the reference value of the camera lens.

Focal depth Tz of the camera lens for each specific case can be determined, for instance, as follows: $Tz=2DC/(f/s)^2$ where: D is the camera lens aperture ($m^2$), C is the camera pixel size (μm), f is the camera lens focal distance (m), s is the distance from the projection unit to the intersection point of the central beams of the projection unit and the camera (m).

In camera 2 image a projected band usually has the width of (takes up) several pixels of the CCD array of camera 2, due to the fact that the bands can be defocused by the lens or that the object may dissipate light by reflection, the bands have no clearly defined Y coordinate.

The subpixel determination algorithm is used to determine the Y coordinate. The subpixel determination algorithm consists of the following:

Projection unit 1 projects the image of parallel bands in FIG. 5 with the minimum and maximum brightness level 15. At camera 2, we observe bands 17 with varying brightness of pixels slightly blurred due to the defocusing of lenses, camera 2 pixel noise and other distortions. We can assume the brightest pixel as the line center or make a (software) approximation of the pixel values, using, for instance, a parabolic or sinusoidal curve 18, so as to determine the Y coordinate of the line center in camera 2 image to fractions of a pixel.

The available options for resolving ambiguities when several lines are projected simultaneously:

A conclusion can be made based on FIG. 3 and FIG. 4 that the area along the Z coordinate between points 13 and 14 is an area where unambiguity in the definition of the projected band is preserved in camera 2 image. Accordingly, one should attempt to make measurement area Tz less than or equal to this distance.

Figure 6:
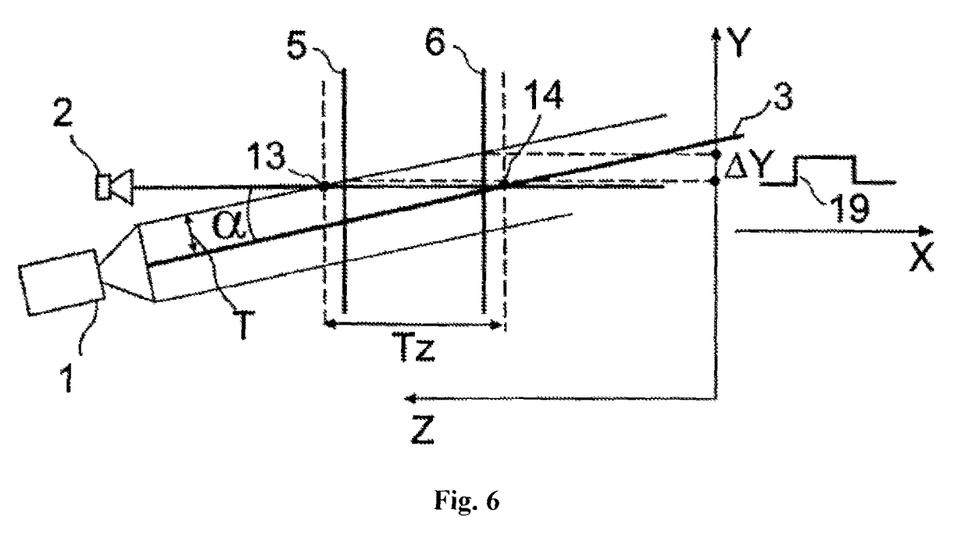
Figure 7:
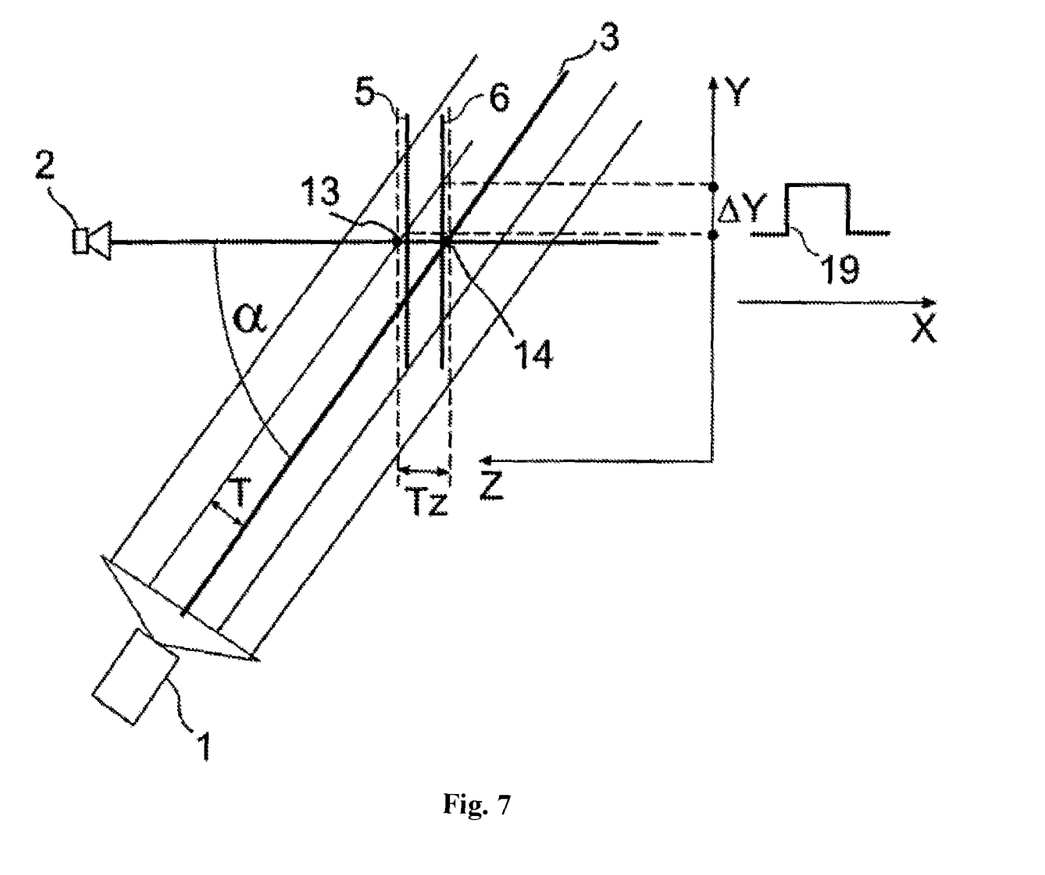

FIG. 6 and FIG. 7 show lines corresponding to bands emitted from projection unit 1 as parallel straight lines parallel to central beam 3 of projection unit 1.

It can be understood from these drawings that relationship tg α=T/Tz exists between angle α, interval T and measurement area Tz, as well as relationship tg α=ΔY/Z exists between ΔY and angle α.

It is obvious that the greater angle α, the larger is the shift of the band ΔY observed in camera 2 image, with the band projected as line 19 in the camera image, which enables us to determine the Z coordinate with greater accuracy, i.e. our system has greater sensitivity to measurements along the Z axis. Besides, the greater the angle, the less the domain of determinacy Tz. This is obvious if the Tz value in FIG. 6 is compared to value Tz in FIG. 7.

With the minimum value of the triangulation angle the camera clearly perceives the projected line and longitudinal coordinate Y, but the perception accuracy of vertical coordinate Z is at its minimum. With the greatest value of the band triangulation angle the bands in the image begin merging, and it is difficult to determine longitudinal coordinate Y, but the perception accuracy of vertical coordinate Z is at its maximum. This stipulates the use of at least two cameras installed at different triangulation angles.

Figure 9:
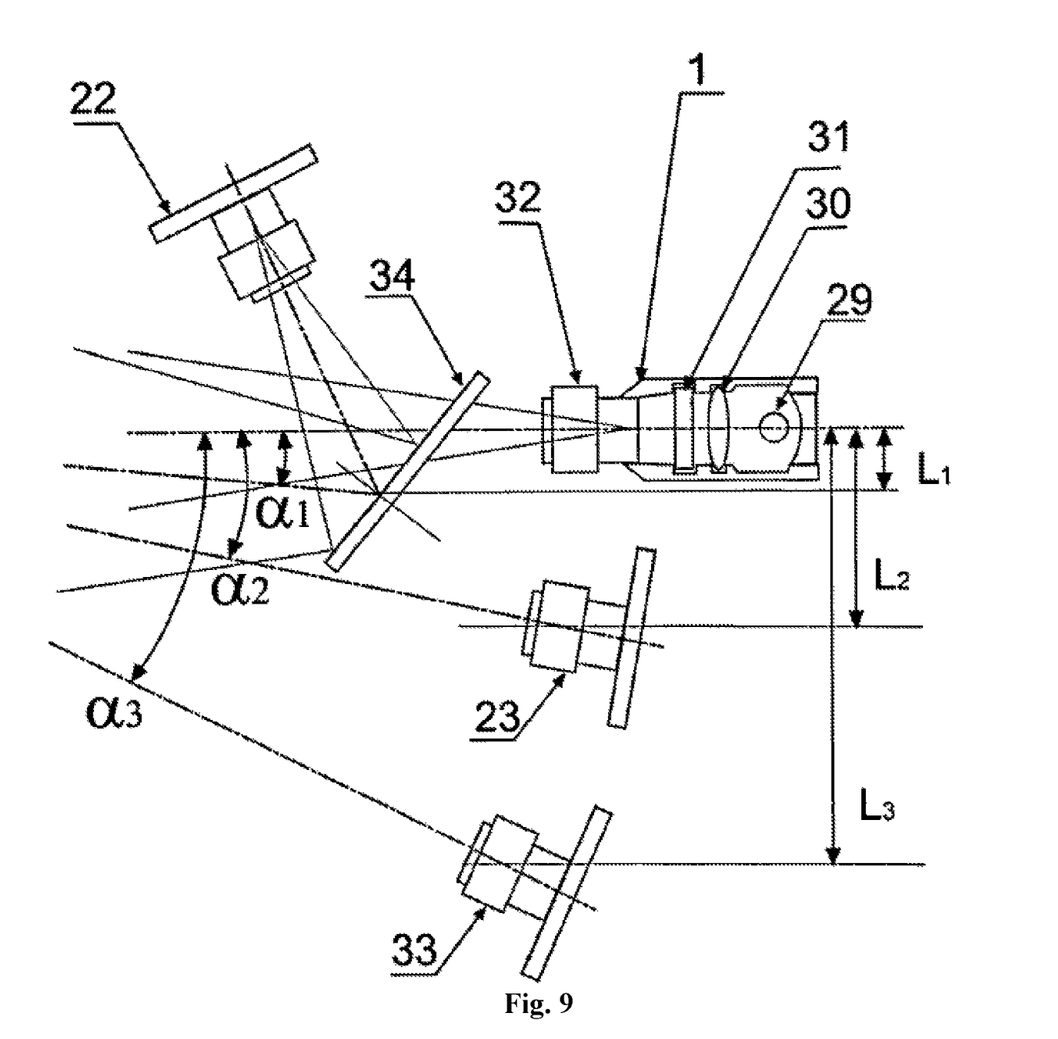

The device in FIG. 9 comprises projection system (unit) 1 consisting of a light source—lamp 29, condenser lens 30, slide 31 containing a drawing of horizontal parallel bands, and lens 32. The device also includes three cameras 22, 23, 33. To ensure that the cameras are as close to projection unit 1 as possible, the first camera 22 has to be placed too close to the projection unit and the camera dimensions may exceed the dimensions of base (base distance) L which corresponds to the chosen angle α.

To solve this problem, it is suggested to use semitransparent mirror 34 or a prism in the path of the beams of camera 22 and the projection system, which makes it possible to space the camera and the projection unit further apart.

Figure 10:
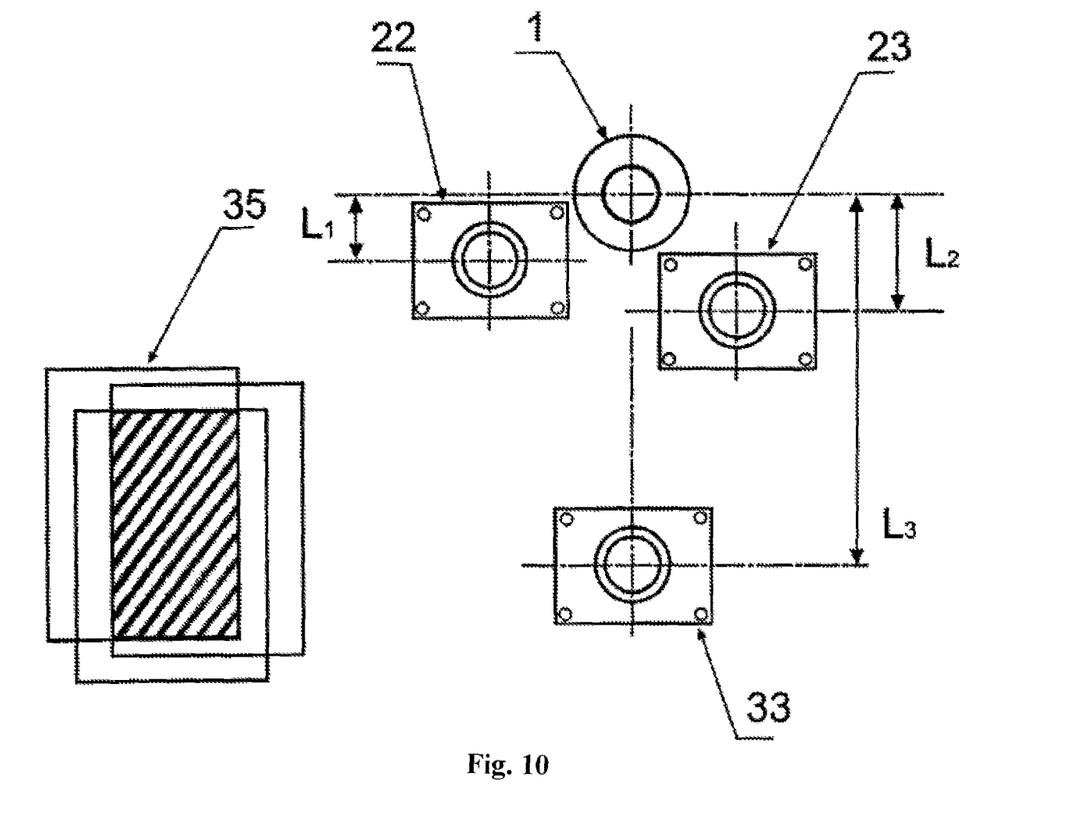

The second solution for placing cameras as close to the projection unit as possible:

Place cameras 22 and 23 on the right and left of projection unit 1. FIG. 10 shows base distances L1 and L2 located on one side of the projection unit which correspond to the triangulation angles. In this case the resulting overlapping of the fields of view of the cameras 35 will be incomplete, which will reduce the measurement area of the object, but this solution is technically simpler to implement than the one requiring installation and adjustment of a semitransparent mirror or prism.

Figure 11:
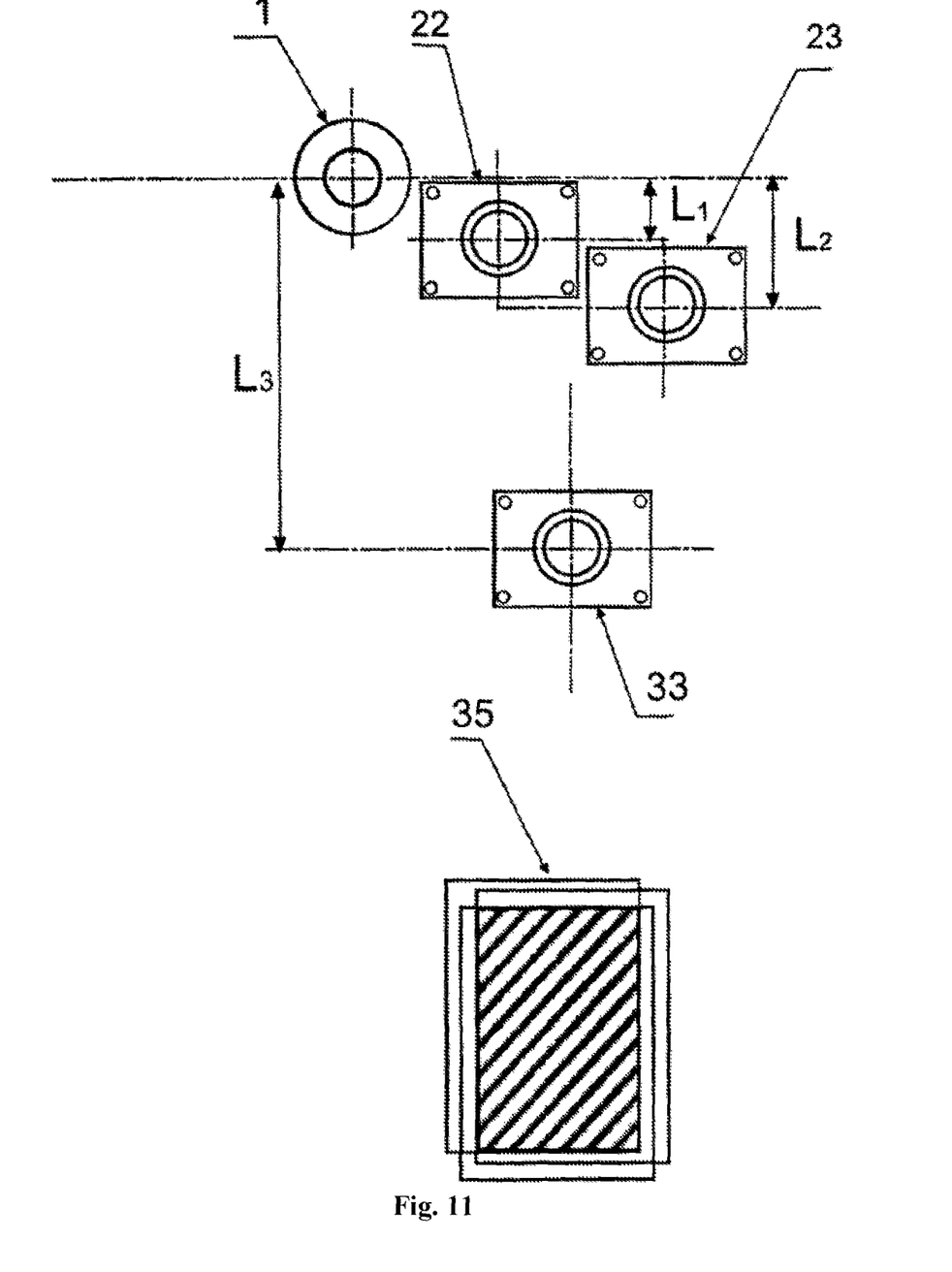

The third method is shown in FIG. 11. The cameras are located on one side of projection unit 1. This makes it possible to achieve greater overlapping of the fields of view of the cameras 35.

Generally, the method for 3D measurement of an object with structured backlighting is implemented as follows. Using projection unit 1, a predetermined image with at least two non-crossing lines along one of its longitudinal axes is projected onto the controlled object. The light of projection unit 1 reflected from the object is recorded with at least two cameras located at different distances from the projection unit thus forming different triangulation angles between the central beam of the projection unit and the central beams of the cameras. In the image from the first camera 2 the longitudinal coordinates of the line centers are determined as the brightest pixels.

Then each line projected by projection unit 1 and formed by the reflected light received by each camera is identified by comparing the coordinates of the lines perceived by the cameras. For this purpose the triangulation angle between the central beam of projection unit 1 and central beam of the first camera 22, placed at a minimum distance from projection unit 1 and a minimum angle $\alpha 1$, is chosen and set equal to the arctangent of the ratio of the distance between the projected bands and the focal depth Tz of this camera lens.

Figure 8:
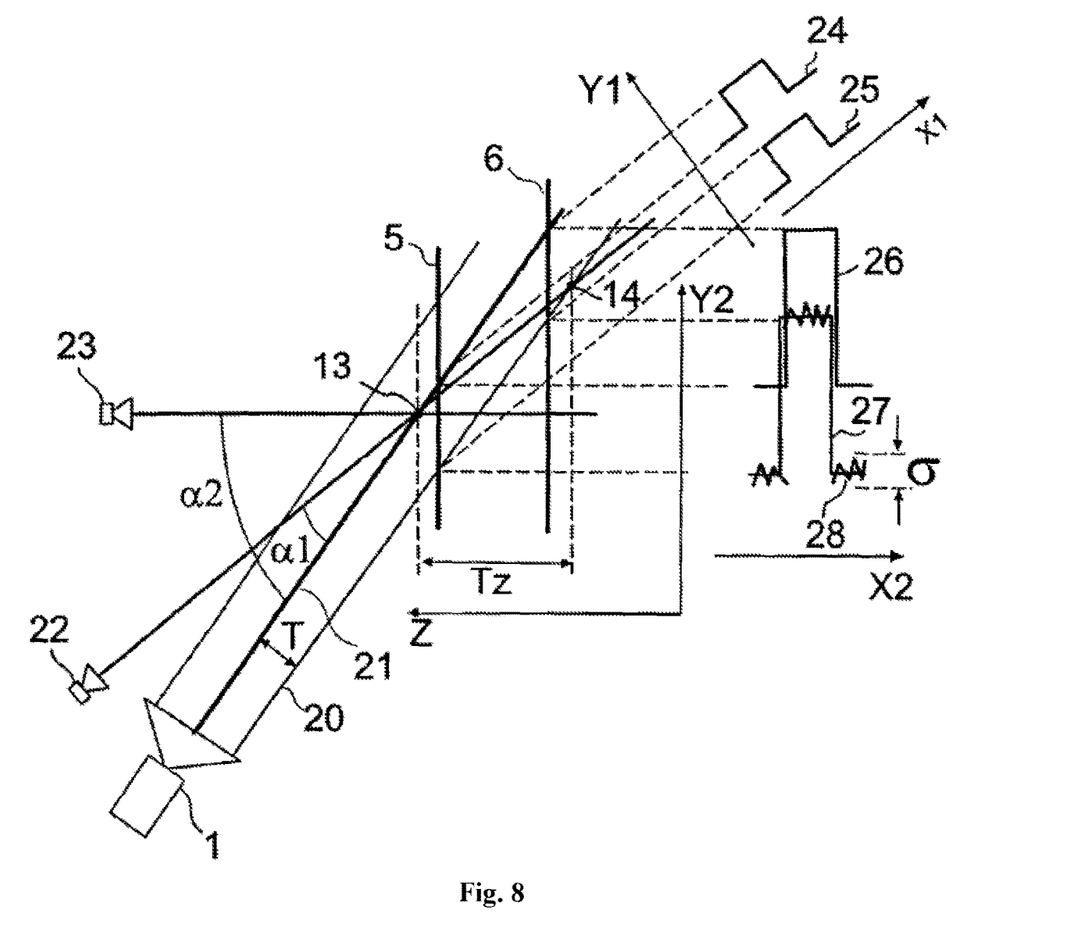

Such conditions imposed on the relative position of projection unit 1 and camera 22 provide for the maximum unambiguity in identifying each projected band. Interval T in FIG. 8 between projected bands 20 and 21 and angle $\alpha 1$ between the first camera 22 and projection unit 1 are chosen based on the ratio of $\alpha 1 = \arctg(T/Tz)$. This makes it possible to differentiate between all the projected bands in the image from the first camera. The band projections onto the image from camera 22 are represented as 24 and 25.

Longitudinal coordinates of the line centers and vertical coordinates are determined in the image of the first camera as the quotient of longitudinal coordinate Y1 by the tangent of the triangulation angle between the central beam of the projection unit and the central beam of the first camera.

Using the line center search algorithm—the subpixel determination algorithm—and based on the relationship $Z = Y1/\tg\alpha 1$ (Y1—coordinates in the image from the first camera), the Z coordinates of all the projected bands are calculated with a certain error $\sigma$, which mainly depends on the triangulation angle $\alpha 1$, on the number of pixels in the CCD array of the camera, and the pixel noise of the selected camera.

The line image width error $\sigma$ (starting with the second camera) shall not exceed $T/\cos \alpha_2$.

To adjust the vertical coordinate Z, its value obtained with the second camera located at a greater triangulation angle $\alpha_2$ than that of the first camera is used, wherefore the position of the same lines is identified in the second camera image as the lines closest to the longitudinal coordinates calculated as the product of the above vertical coordinate Z determined using the first camera and the tangent of the second camera triangulation angle. Thus, to adjust the Z coordinate of the projected bands, the second camera 23 located at a greater triangulation angle $\alpha_2$ to the projection unit $\alpha_2 > \alpha 1$ is used. Bands 20 and 21 projected by projection unit 1 onto the image from the second camera 23 look as 26 and 27. For clarity, bands 26 and 27 are represented with a slight shift, whereas in fact they merge in the image from the second camera and are hard to identify. But if the Z coordinate obtained earlier according to the formula $Z = Y1/\tg\alpha 1$ for band 20 is projected according to the formula $Y2 = Z*\tg\alpha_2$ onto the image from camera 23, noise curve 28 becomes visible which will help us identify the position of band 20 onto the image from camera 23. The same procedure shall be followed for each band to differentiate it from others. The center of each line has to be re-determined with adjustment based on the image from camera 23, as well as the new more accurate Z coordinate calculated. Angle $\alpha_2$ is chosen so that a does not exceed $T/\cos \alpha_2$.

Then, similarly to the described procedure for determining coordinates using the first camera, the second camera is used to determine the adjusted values of the longitudinal and vertical coordinates for these lines.

The vertical coordinate value obtained using the third, fourth and subsequent cameras is used for further adjustment of the vertical coordinate. For further adjustment of Z coordinates of the projected bands additional cameras with large triangulation angles can be used to achieve the required accuracy of the band's Z coordinate definition. Each subsequent camera with a large triangulation angle shall meet the conditions provided above for cameras with a small triangulation angle. In some cases, at least two cameras are located on different sides of the projection unit, but the images and triangulation angles of all cameras have to be located on one side of the central beam of the projection unit, which can be ensured using a semitransparent mirror positioned across the central beams of the projection unit and, preferably, of the first camera in FIG. 9.

Coordinates are measured and determined using a computer processor, and a 3D image is output to the computer display.

The technical result consists in simplification and complete automation of the process of controlling linear dimensions of three-dimensional objects, reduction of the measurement process duration and nearly complete elimination of errors in the event of mechanical oscillations arising in positions of the equipment (projection unit and cameras) in relation to the measurement object, as the projection unit and the cameras are executed as a portable tool in a single housing.

INDUSTRIAL APPLICABILITY

This invention is implemented with general-purpose equipment widely used in the industry.

The invention claimed is:

1. A method comprising:
   at a 3D measurement system comprising a projector, a computer, a first camera and a second camera, wherein the first camera and the second camera are located at different distances from the projector:
   projecting a known projection pattern that includes at least two non-crossing lines to form a first band and a second band on a surface of an object;
   while projecting the known projection pattern onto the surface of the object:
   recording, using the first camera, a first image of the surface of the object; and
   recording, using the second camera, a second image of the surface of the object;

using the first image acquired by the first camera, determining, by the computer, a first longitudinal coordinate of a first point within the first band and a first vertical coordinate of the first point within the first band, wherein the first vertical coordinate is along a first coordinate axis that is parallel to an optical axis of the projector and the first longitudinal coordinate is along a second coordinate axis that is perpendicular to the optical axis of the projector; and using the second image acquired by the second camera, determining a second longitudinal coordinate of the first point within the first band and determining a second vertical coordinate of the first point within the first band, wherein the second vertical coordinate is along the first coordinate axis that is parallel to the optical axis of the projector and the second longitudinal coordinate is along the second coordinate axis that is perpendicular to the optical axis of the projector; and determining a final vertical coordinate of the first point by comparing the first longitudinal coordinate to the second longitudinal coordinate, wherein:
the final vertical coordinate is determined by adjusting the first vertical coordinate based on a comparison between the first longitudinal coordinate and the second longitudinal coordinate; and
the final vertical coordinate is along the first coordinate axis.

2. The method of claim 1, further comprising, identifying the second band, comprising:
using the first image acquired by the first camera, determining a third longitudinal coordinate of a second point within the second band and a third vertical coordinate of the second point within the second band, wherein:
the third longitudinal coordinate is along the second coordinate axis and the third vertical coordinate is the first coordinate axis; and
determining the final vertical coordinate includes comparing the third longitudinal coordinate of the second point within the second band with the first longitudinal coordinate of the first point within the first band and comparing the third vertical coordinate of the second point within the second band with the first vertical coordinate of the first point within the first band.

3. The method of claim 1, wherein using the second image acquired by the second camera to adjust the determined first vertical coordinate comprises determining a distortion of the first band due to a curvature of the surface of the object.

4. The method of claim 1, wherein determining the first longitudinal coordinate comprises:
at the projector, projecting the known projection pattern with a minimum brightness level and projecting the known projection pattern with a maximum brightness level;
creating a sinusoidal representation of pixel values created from projecting the known projection pattern with the minimum and the maximum brightness levels; and
determining the first longitudinal coordinate as the maximum pixel value of the sinusoidal representation of pixel values.

5. The method of claim 1, wherein a distance between the first camera and the projector is less than a distance between the second camera and the projector.

6. The method of claim 1, wherein an angle formed between a center beam of the first camera and a center beam of the projector is less than an angle formed between a center beam of the second camera and the center beam of the projector.

7. The method of claim 1, further comprising, shifting the projected first band and second band along a longitudinal axis that is perpendicular to the optical axis of the projector, and capturing, by the second camera, a plurality of additional images, each image captured corresponding to a shift in the first band and the second band.

8. The method of claim 1, wherein the first point within the first band is a point of ambiguity.

9. The method of claim 8, further comprising determining that the first point belongs to the first band.

10. The method of claim 9, wherein determining that the first point belongs to the first band comprises determining a focal depth of the first camera and a focal depth of the second camera.

11. The method of claim 1, wherein the angle formed between a center beam of the first camera and a center beam of the projector is within a minimum threshold angle.

12. The method of claim 11, wherein the angle within the minimum threshold angle is formed using a semitransparent mirror in a path of the center beam of the first camera and a path of the center beam of the projector.

13. The method of claim 11, wherein the angle formed between the center beam of the first camera and the center beam of the projector is less than or equal to the arctangent of the ratio between the distance between the first band and the second band and a focal depth of a lens of the first camera.

14. The method of claim 1, wherein the first camera is located on a first side of the projector and the second camera is located on a second side of the projector, the second side of the projector opposite the first side of the projector.

15. The method of claim 1, further comprising a third camera to record a third image, wherein the final vertical coordinate is determined based on comparing the first longitudinal coordinate to a third longitudinal coordinate of the first point within the first band in the third image, wherein the third longitudinal coordinate is along the second coordinate axis.

* * * * *